(12) United States Patent
Krass

(10) Patent No.: US 8,043,592 B2
(45) Date of Patent: Oct. 25, 2011

(54) CASCADED POWER PLANT PROCESS AND METHOD FOR PROVIDING REVERSIBLY USABLE HYDROGEN CARRIERS IN SUCH A POWER PLANT PROCESS

(75) Inventor: Florian Krass, Weggis (CH)

(73) Assignee: Silicon Fire AG, Meggen (CH)

( * ) Notice: Subject to any disclaimer, the term of this patent is extended or adjusted under 35 U.S.C. 154(b) by 301 days.

(21) Appl. No.: 11/746,620

(22) Filed: May 9, 2007

(65) Prior Publication Data

US 2007/0264184 A1 Nov. 15, 2007

(30) Foreign Application Priority Data

| May 10, 2006 | (DE) | 10 2006 021 960 |
| Oct. 29, 2006 | (EP) | 06022578 |
| Dec. 18, 2006 | (EP) | 06126325 |
| Jan. 11, 2007 | (EP) | 07100387 |

(51) Int. Cl.
*C01B 31/36* (2006.01)
(52) U.S. Cl. ......... 423/345; 423/344; 423/441
(58) Field of Classification Search .......... 423/345, 423/441; 422/190, 198; 60/205–207
See application file for complete search history.

(56) References Cited

U.S. PATENT DOCUMENTS

| 4,368,181 A * | 1/1983 | Suzuki et al. ........... 423/345 |
| 4,963,286 A | 10/1990 | Coyle et al. |
| 5,037,626 A * | 8/1991 | Ho et al. ............... 423/345 |
| 5,263,330 A | 11/1993 | Rockenfeller et al. |
| 5,798,137 A | 8/1998 | Lord et al. |
| 6,395,248 B1 * | 5/2002 | Kim ................... 423/349 |

FOREIGN PATENT DOCUMENTS

| EP | 0052487 A1 | 5/1982 |
| EP | 0370687 A2 | 5/1990 |
| EP | 0384051 A1 | 8/1990 |
| EP | 060225786 | 10/2006 |
| EP | 061263257 | 12/2006 |

(Continued)

OTHER PUBLICATIONS

Pathak, L.; Bandyopadhyay, D., "Effect of Heating Rates on the Synthesis of Al2O3-SiC Composites by the Self-Propagating Hihg-Temperature Synthesis (SHHS) Technique". J. Am. Ceram. Soc. 84 [5] 915-920 (2001).*

(Continued)

*Primary Examiner* — Stuart Hendrickson
*Assistant Examiner* — Richard M Rump
(74) *Attorney, Agent, or Firm* — Duane Morris LLP; Guy W. Chambers

(57) ABSTRACT

In a series of reactions for power plant energy generation designed to make beneficial use of oil bearing sands, oil bearing shale and other starting materials containing silicon dioxide, the silicon dioxide starting materials are combined with a primary energy provider containing hydrocarbon to start a first reaction. During this first reaction, the silicon dioxide containing starting material is heated and crystalline silicon is produced. Then, the crystalline silicon is used in a second reaction which runs exothermically (i.e., releases heat). The heat produced from the second reaction is employed as a secondary energy to supplement the primary energy provider when heating the starting material in the first reaction and/or to supply at least one further reaction or series of reactions with the required energy, at the end of which a silicon compound is produced.

8 Claims, 8 Drawing Sheets

*) for aluminium melting lance (like welding electrode), or copper rod having aluminium layer (Roman candle principle)

FOREIGN PATENT DOCUMENTS

| | | |
|---|---|---|
| GB | 1475488 | 6/1977 |
| JP | 57-175711 A | 10/1982 |
| JP | 58115016 | 7/1983 |
| JP | 62-108725 A | 5/1987 |
| JP | 10-500933 T | 1/1998 |
| JP | 2002-193612 A | 7/2002 |
| JP | 2002-233513 A | 8/2002 |
| JP | 2002-289497 A | 10/2002 |
| JP | 2004-4507133 A | 3/2004 |
| KR | 2002-0056133 | 7/2002 |
| WO | WO 99/13084 | 3/1999 |

OTHER PUBLICATIONS

Mazzoni, A.D.; Aglietti, E.F., "Aluminothermic Reduction and Nitriding of High Silica Materials Diatomite and Bentonite Minerals". Applied Clay Science [17] 127-140 (2000).*

Pyromex Waste to Energy, "*Pyromex Invention Main Elements of a Pyromex Plant,*" downloaded from website http://www.pyromex.com, p. 1of 1, Jan. 13, 2009.

Pyromex Waste to Energy, "*Pyromex Invention Material Flow,*" downloaded from website http://www.pyromex.com, p. 1of 1, Jan. 13, 2009.

Pyromex Waste to Energy, "*Pyromex Invention Waste Types,*" downloaded from website http://www.pyromex.com, p. 1of 1, Jan. 13, 2009.

Pyromex Waste to Energy, "*Pyromex Invention Mobile Test Plant,*" downloaded from website http://www.pyromex.com/trailer/index.htm, 2 pgs. Jan. 13, 2009.

Pyromex Waste to Energy, "*Pyromex the Economics,*" downloaded from website http://www.pyromex.com/economics/index.htm, p. 1of 1, Jan. 13, 2009.

Pyromex Waste to Energy, "*Pyromex Invention—The Plant,*" downloaded from website http://www.pyromex.com/innovation/index.htm, 2 pgs., Jan. 13, 2009.

Pyromex Waste to Energy, "*Pyromex Invention Typical Layout,*" downloaded from website http://www.pyromex.com., p. 1of 1, Jan. 13, 2009.

Tsuda, H., et al; "Preparation of Nanostructered Silcon Carbide Using a Chemical Vapor Reaction" Advanced *Engineering Ceramics and Composites* (date. . ); pp. 81-94.

Chemical Abstract, vol. 78, No. 22; $4^{th}$, abstract No. 139664y; Jun. 1973, p. 228Columbus OH, US & JP-A-73 19 610 (Agency of Industrial Sciences and Technology).

L. A. Harris, et al; "Microscopy of SiC powders synthesized by reacting colloidal silica and pitch"; *Journal of American Society*; vol. 67, No. 6; Jun. 1984; pp. C-121-C-124; Columbus OH.

M. A. Janney et al; "Carbothermal Synthesis of silicon carbide"; *ORNL-6169*; May 1985; pp. I, II, III and 1-18; Oak Ridge National Laboratory: Tennessee US.

* cited by examiner

First partial reaction

Second partial reaction

Third partial reaction

4th partial reaction

5th partial reaction

6th partial reaction

7th partial reaction

8th partial reaction

9th partial reaction

10th partial reaction

11th partial reaction

12th partial reaction

13th partial reaction

14th partial reaction

15th partial reaction

*) for aluminium melting lance (like welding electrode), or copper rod having aluminium layer (Roman candle principle)

CASCADED POWER PLANT PROCESS AND METHOD FOR PROVIDING REVERSIBLY USABLE HYDROGEN CARRIERS IN SUCH A POWER PLANT PROCESS

CROSS-REFERENCES TO RELATED APPLICATIONS

The present application claims the priorities of German Patent Application 102006021960, which was filed with the German Patent and Trademark Office on May 10, 2006;

European Patent Application 06 022 578.6, which was filed with the European Patent Office on Oct. 29, 2006;

European Patent Application 06 126 325.7, which was filed with the European Patent Office on Dec. 18, 2006; and European Patent Application 07 100 387.5 which was filed with the European Patent Office on Jan. 11, 2007. All applications are incorporated herein by reference in their entirety for all purposes.

BACKGROUND OF THE INVENTION

Carbon dioxide is a chemical compound made of carbon and oxygen. Carbon dioxide is a colorless and odorless gas. At low concentration, it is a natural component of air and arises in living organisms during cell respiration, but also during the combustion of carbonaceous substances with sufficient oxygen. Since the beginning of industrialization, the $CO_2$ component in the atmosphere has significantly increased. The main reasons for this are the $CO_2$ emissions caused by humans—known as anthropogenic $CO_2$ emissions.

The carbon dioxide in the atmosphere absorbs a part of the thermal radiation. This property makes carbon dioxide into a greenhouse gas and is one of the causes of the greenhouse effect.

For these and also other reasons, research and development is currently being performed in greatly varying directions to find a way of reducing the anthropogenic $CO_2$ emissions. There is a great need for $CO_2$ reduction in particular in connection with energy production, which is frequently performed by the combustion of fossil energy carriers, such as coal or gas, but also in other combustion processes, for example, during garbage combustion. Hundreds of millions of tons of $CO_2$ are released into the atmosphere every year by such processes.

The fuels required for producing heat generate $CO_2$, as explained at the beginning. Up to this point, no one has arrived at the idea of using the sand provided in oil-bearing sands ($SiO_2$), oil-bearing shale ($SiO_2+[CO_3]^2$), in bauxite, or tar-bearing sands or shales, and other mixtures to reduce the $CO_2$ discharge and, in addition, obtain new raw materials and above all energy from the products of such a novel method.

Instead of using naturally occurring mixtures of sand and oil in this novel method, industrial or natural wastes containing hydrocarbons, possibly after admixing with sand, may also be used. Using natural asphalt (also referred to as mineral pitch) instead of the oil component is also conceivable. A mixture made of asphalt with pure sand or with construction rubble which contains a sand component is especially preferable.

However, water glass, a mixture of sand with acid or base, may also be used, the water glass being admixed with mineral oils in order to provide the hydrocarbon component necessary for the present invention (microemulsion method).

The present invention may also be used particularly advantageously for cleaning beaches and sand banks contaminated after a tanker accident, for example. A vehicle is best suitable for this purpose, preferably a ship which is equipped with one or more reaction areas according to the present invention. Therefore, the contaminated sand, including heavy oil, may thus be processed on location and converted into valuable products without stressing the environment. Energy is obtained at the same time.

The reserves of oil-bearing sands ($SiO_2$) and shales ($SiO_2+[CO_3]^2$) are known to exceed the world oil reserves multiple times over. The technical methods applied for separating oil and minerals are currently ineffective and too costly. Natural asphalt occurs at multiple locations of the earth, but is currently mined at commercial scale primarily in Trinidad.

Sand occurs in greater or lesser concentrations everywhere on the surface of the earth. A majority of the sand occurring comprises quartz (silicon dioxide; $SiO_2$).

However, silicon components are also present in gneiss, mica, granite, slate, and bauxite. Therefore, these rocks may also be used.

The object of the present invention is to provide such possible raw materials and describe their technical production. The chemical findings used in the method are characterized in that the silicon present in the sands and shales and other mixtures participate in a reaction, and a reversible hydrogen carrier is provided.

The cascaded sequence of individual reactions (also referred to here as energy-material cascade coupling or $EMC^2$) is characteristic for the present invention. These individual reactions are coupled to one another in such a way that either the amount of energy released increases with each reaction step, or other (preferably higher-value or higher-energy) reaction products are provided with each reaction step. For this purpose, the individual reaction areas/zones in which partial reactions run are connected to one another thermally and/or for the transfer of reactants.

In addition, it is an object to provide alternative possible approaches for generating and providing energy in the form of reversible hydrogen carriers, which are transportable harmlessly, and providing the hydrogen at the consumer.

According to the present invention, in a first partial reaction in a power plant process, silicon is obtained from one or more of the following starting materials: oil sand, oil shale, bauxite, gneiss, mica, granite, or slate. The use of the number "1" is not to indicate that this partial reaction is executed first. A blend of one or more of the cited starting materials is possibly used in the scope of this first partial reaction, which is liquefied by adding an acid or base, to improve the transportability through pipes, for example. In this case, the acid or base may be reclaimed again by the heating using the primary energy providers.

A preferred embodiment of the present invention exploits, inter alia, the fact that silicon (e.g., as a powder at suitable temperature) may be reacted directly after ignition with pure (cold) nitrogen (e.g., nitrogen from the ambient air) to form silicon nitride, because the reaction is strongly exothermic. The heat arising may be used in reactors, for example, in power plant processes. This reaction of silicon to form silicon nitride is referred to here as the second partial reaction.

The silicon arising in the first partial reaction according to the present invention in power plant processes from oil sand, oil shale, bauxite, gneiss, mica, granite, and/or slate is surface-active and may be treated catalytically (e.g., using magnesium and/or aluminum as a catalyst) with hydrogen, so that monosilane results. This reaction of silicon to form monosilane is referred to here as the third partial reaction. This monosilane may be removed from the reaction chamber and subjected a further time to a catalytic pressure reaction in another location (fourth partial reaction). According to the equation Si+SiH4→(Using catalysts such as Pt, etc.)→Si(SiH4)+ $SiH_n(SiH_4)_m + Si_nH_m$ long-chain silanes may be prepared, which may be used both in the technology of fuel cells and in engines. The silanes are a possible form of a reversible hydrogen carrier.

However, silicon (such as silicon powder) may also be nitrated in the process according to the present invention in nitrogen ($N_2$) atmosphere at temperatures of approximately 1400° C. to form silicon nitride $Si_3N_4$. This type of reaction is a variation of the second partial reaction.

The silicon nitride may then be converted into $NH_3$, for example, using hydrolysis. An example of the reaction running in such a hydrolysis is provided in the following equation:

$$Si_3N_4 + 6 H_2O \rightarrow 3 SiO_2 + 4 NH_3$$

Thus, $NH_3$ and silicon dioxide arise in this reaction. $NH_3$ is an outstanding hydrogen carrier. Because the hydrolysis of silicon nitride runs relatively slowly, the silicon nitride is used according to the present invention either as flakes, as a powder, or in porous form. A significantly larger surface thus results, which makes the hydrolysis of the silicon nitride much more efficient and rapid. This approach is based on the finding that in the hydrolysis of silicon nitride, surface hydrolysis plays an essential role. The hydrolysis thus becomes more efficient due to the intentional enlargement of the surface of the silicon nitride. The reaction of silicon nitride to form $NH_3$ using hydrolysis is referred to here as the fifth partial reaction. The use of $Si_3N_4$ nanostructures or nanocrystals is especially effective here, which may be obtained from a sol-gel process, for example. The energy for the sol-gel process may in turn be taken from one of the partial reactions according to the present invention.

The silicon, the $NH_3$, but also the silanes are outstanding energy providers, which may be conveyed to a consumer without problems, in order to cleave off hydrogen there. However, hydrogen peroxide is better suitable as an energy provider. The hydrogen peroxide may be generated in a further partial reaction according to the present invention, which is coupled to a power plant process or integrated in such a process. This is also true for the production of silicon, $NH_3$, or silanes, which may also be integrated in such a power plant process or coupled to such a process.

Further details and advantages of the present invention are described in the following on the basis of exemplary embodiments.

Various aspects of the present invention are schematically illustrated in the figures of the drawing:

DETAILED DESCRIPTION OF THE INVENTION

Figure 1:
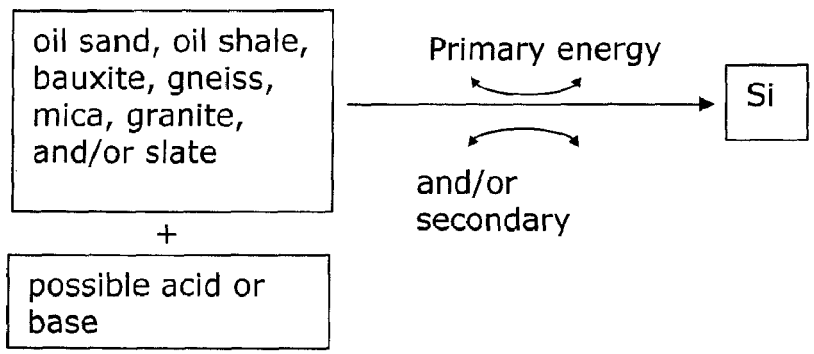
FIG. 1: shows a diagram of a first partial reaction according to the present invention.
Figure 2:
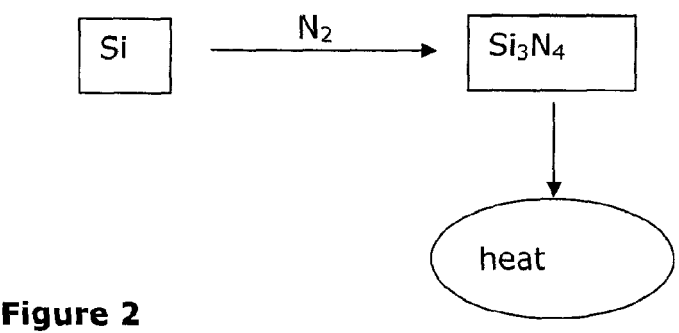
FIG. 2: shows a diagram of a second partial reaction according to the present invention.
Figure 3:
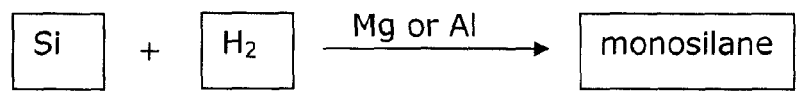
FIG. 3: shows a diagram of a third partial reaction according to the present invention.
Figure 4:
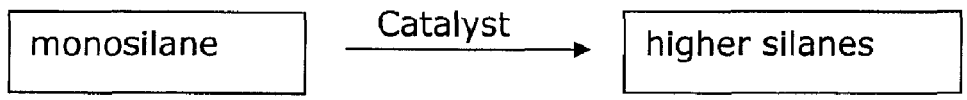
FIG. 4: shows a diagram of a fourth partial reaction according to the present invention.
Figure 5:
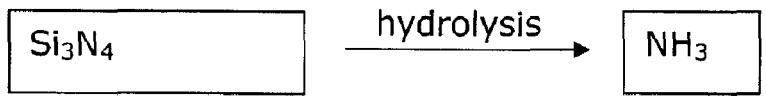
FIG. 5: shows a diagram of a fifth partial reaction according to the present invention.
Figure 6:
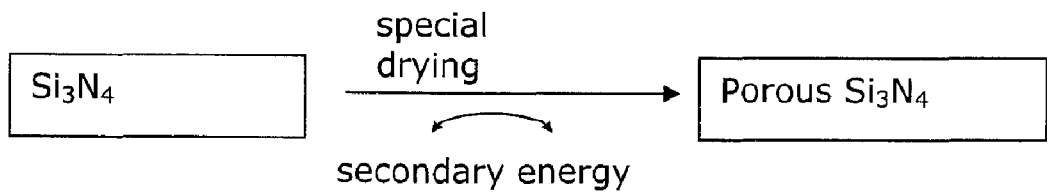
FIG. 6: shows a diagram of a sixth partial reaction according to the present invention.
Figure 7:
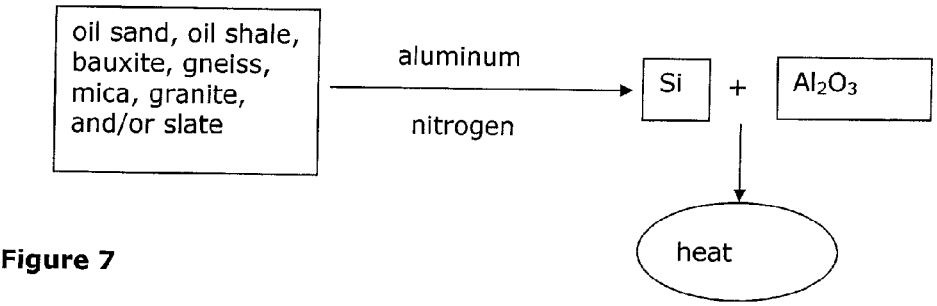
FIG. 7: shows a diagram of a seventh partial reaction according to the present invention.
Figure 8:
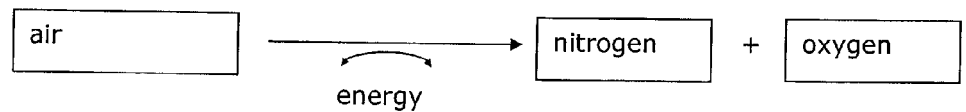
FIG. 8: shows a diagram of an eighth partial reaction according to the present invention.
Figure 9:
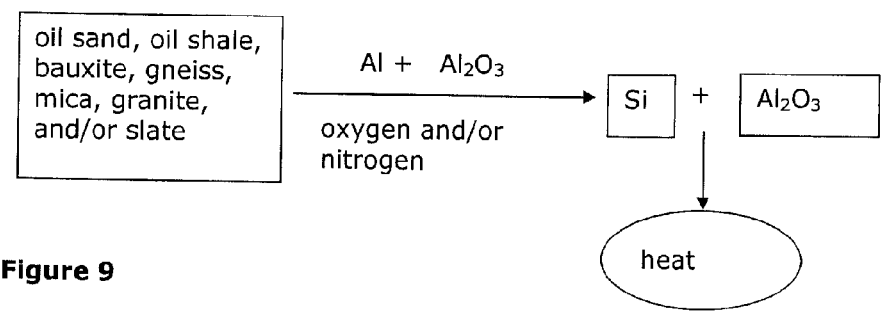
FIG. 9: shows a diagram of a ninth partial reaction according to the present invention.
Figure 10:
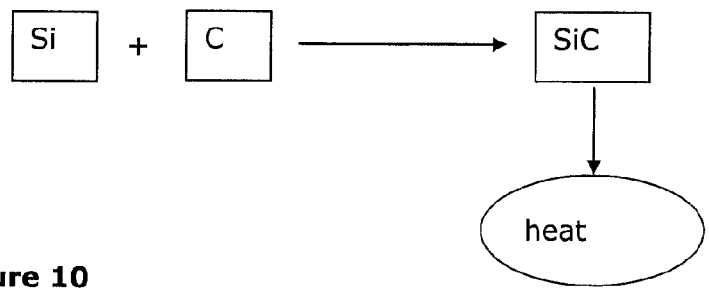
FIG. 10: shows a diagram of a tenth partial reaction according to the present invention.
Figure 11:
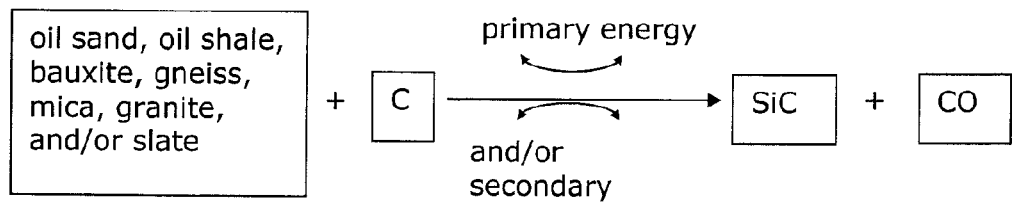
FIG. 11: shows a diagram of an eleventh partial reaction according to the present invention.
Figure 12:
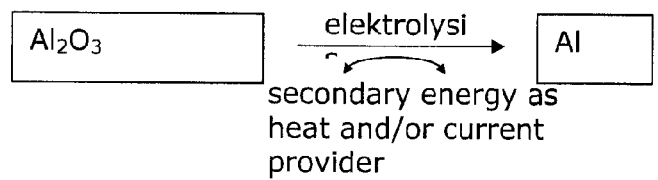
FIG. 12: shows a diagram of a twelfth partial reaction according to the present invention.
Figure 13:
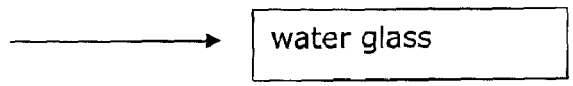
FIG. 13: shows a diagram of a thirteenth partial reaction according to the present invention.
Figure 14:
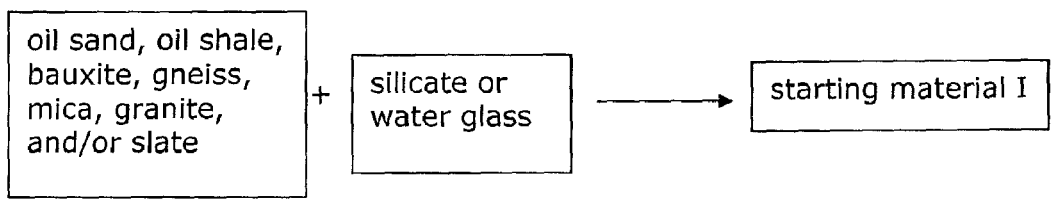
FIG. 14: shows a diagram of a fourteenth partial reaction according to the present invention.
Figure 15:
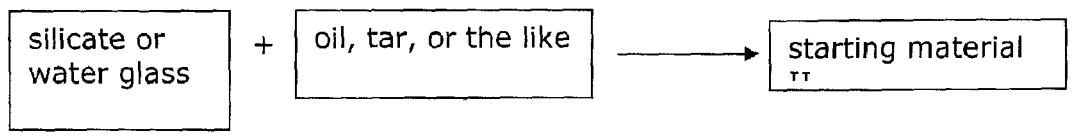
FIG. 15: shows a diagram of a fifteenth partial reaction according to the present invention.

In the following, the present invention is described on the basis of examples. A first example relates to the use of the present invention in a power plant operation, in order to reduce or entirely eliminate the $CO_2$ discharge occurring as energy is obtained therein.

According to the present invention, there is an array of chemical reactions executed in a targeted way, in which new chemical compounds (called products) arise from the starting materials (also called educts or reactants). The (partial) reaction(s) according to the present invention is (are) designed in such a way that $CO_2$ is consumed and/or bound in significant quantities.

In a first exemplary embodiment, for example, sand, which is admixed with mineral oil, heavy oil, tar, and/or asphalt—as the primary energy providers—or oil shale is used as the starting material. However, one or more of the following primary energy providers may also be used: brown coal or hard coal, peat, wood, gas.

These starting materials are supplied to a reaction chamber, for example, in the form of an afterburner or a combustion chamber. $CO_2$ is blown into this chamber.

In the first exemplary embodiment, this $CO_2$ may be the $CO_2$ exhaust gas which arises in large quantities when energy is obtained from fossil fuels and until now has escaped into the atmosphere in many cases. Preferably, but not necessarily, (ambient) air is additionally supplied to the chamber at least at the beginning of the first partial reaction. Instead of the ambient air, or in addition to the ambient air, steam or hypercritical $H_2O$ at above 407° C. may be supplied to the method. In order to be able to incorporate the hypercritical $H_2O$ successfully into the running process, however, a high pressure is preferably used in the corresponding reaction chamber/combustion chamber. Pressures of 150 bar and more have proven themselves in particular. A pressure of approximately 300 bar is especially preferable.

Furthermore, nitrogen may be blown in at another point in the method (e.g., during the first partial reaction), or the combustion chamber, respectively. In addition, catalysts or a type of catalyst may be used in one or more of the partial reactions. Aluminum is especially suitable. A reduction occurs in the chamber under suitable environmental conditions, which may be described in greatly simplified form as follows:

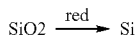

I.e., the quartz component present in the starting material (s) is converted into crystalline silicon (first partial reaction).

The mineral oil of the sands used assumes the role of the primary energy provider and is itself largely pyrolytically decomposed in the method according to the present invention (i.e., during the first partial reaction) at temperatures above 1000° C. into hydrogen ($H_2$) and a compound similar to graphite (e.g., in the form of coke). However, the other primary energy providers may also be used analogously together with the starting material(s). Thus, in the running first partial reaction, the hydrogen is withdrawn from the hydrocarbon chain of the primary energy providers. The hydrogen may be coupled according to the present invention to one of the reversible energy carriers already cited (e.g., in the scope of the third partial reaction), as explained in the following on the basis of examples. However, hydrogen, which is either introduced directly into the method, or originates from a gaseous alkane or from water, such as water steam, for example, may also be used in one or more of the partial reactions.

Silicon Nitride as an Energy Carrier:

In order to be able to provide powdered or flaked silicon nitride, for example, the silicon arising in the process (e.g., during or at the end of the first partial reaction) may be injected or conveyed into a chamber, or it may also drop downward from above through a trajectory. Nitrogen (e.g., nitrogen from the ambient air), but preferably pure nitrogen (having 90-100 volume-percent nitrogen) is blown into this chamber or trajectory. The silicon combusts with the nitrogen to form silicon nitride, a temperature of greater than 1000° C., preferably greater than 1350° C., to exist in the chamber. This reaction (second partial reaction) is strongly exothermic. The quantity of heat (referred to as secondary energy) arising in the reaction (second partial reaction) may either be used for heating further starting material(s) (in this case, the quantity of heat released in the second partial reaction is used to supply the first partial reaction with sufficient energy if, for example, the originally added primary provider was consumed), or the quantity of heat may be decoupled from the second process (second partial reaction) to supply further endothermic processes (e.g., the sixth partial reaction) with energy in a cascade. Additionally or alternatively, the quantity of heat arising may also be used for heating a medium (such as water) and thus for driving a gas turbine or steam turbine (obtaining energy conventionally).

For example, porous silicon nitride may be produced by drying the silicon nitride under extreme conditions. An approach in which a type of autoclave is used for the drying, in which there are elevated temperature and pressure, is preferred. The required quantity of heat (referred to as secondary energy) may in turn be obtained from the exothermic processes already described (e.g., from the second partial reaction). The pressure and the temperature are to be selected in such a way that the phase boundary between gas and liquid is neutralized before cooling and/or drying occurs. Porous silicon nitride arises in this process (sixth partial reaction). However, the sixth partial reaction may also be altered in such a way that silicon nitride nanostructures or nanocrystals arise in a sol-gel process, which may be used as a reversible energy accumulator or as a starting material for providing $NH_3$.

In a second exemplary embodiment, the present invention is applied in connection with a pyrolysis method of Pyromex AG, Switzerland. However, the present invention may also be used as a supplement or alternative to the oxyfuel method. Thus, for example, using the present invention, an energy-material cascade coupling ($EMC^2$) may be performed according to the following approach. In an alteration of the oxyfuel method, additional heat is generated with the addition of aluminum, preferably liquid or powdered aluminum (this aluminum may be produced using a twelfth partial reaction, for example), and with combustion of oil sand (instead of oil or coal), first with oxygen ($O_2$), but then preferably with nitrogen ($N_2$) and possibly aluminum (Wacker accident) (seventh partial reaction). However, because of the large amounts of heat which arise in the exothermic seventh partial reaction, the oil or coal may be left out here as the primary energy provider.

In the seventh partial reaction, the aluminum withdraws the oxygen from the silicon dioxide and is oxidized to form aluminum oxide. This partial reaction functions especially well if no or only a small amount of oxygen is introduced from the outside, because the oxygen immediately generates a thin skin on the aluminum surface and thus quasi-passivates the aluminum. Therefore, an embodiment in which a nitrogen atmosphere is at least temporarily predefined in the reaction area is especially preferable.

If nitrogen coupling to silicon compounds is needed, the pure nitrogen atmosphere is preferably achieved from ambient air by combustion of the oxygen component of the air with propane gas (known from propane nitration). However, there are also other ways of achieving a separation of oxygen and nitrogen. The reverse osmosis method, the classical Linde method, or a method which operates using a perowskite membrane are cited as further possible methods. Providing the nitrogen is referred to as the eighth partial reaction.

According to the present invention, aluminum may be used. It is currently only possible to obtain aluminum cost-effectively from bauxite. Bauxite contains approximately 60% aluminum oxide ($Al_2O_3$), approximately 30% iron oxide ($Fe_2O_3$), silicon oxide ($SiO_2$), and water. This means the bauxite is typically always "contaminated" with the iron oxide ($Fe_2O_3$) and the silicon oxide ($SiO_2$).

$Al_2O_3$ may not be chemically reduced because of its extremely high lattice energy. However, it is possible to produce aluminum industrially by fused-salt electrolysis (cryolite-alumina method) of aluminum oxide $Al_2O_3$. The $Al_2O_3$ is obtained by the Bayer method, for example. In the cryolite-alumina method, the aluminum oxide is melted with cryolite (salt: $Na_3[AlF_6]$) and electrolyzed. In order not to have to work at the high melting temperatures of aluminum oxide of 2000° C., the aluminum oxide is dissolved in a melt of cryolite. Therefore, the operating temperature in the method is only from 940 to 980° C.

In fused-salt electrolysis, liquid aluminum arises at the cathode and oxygen arises at the anode from the $Al_2O_3$. Carbon blocks (graphite) are used as anodes. These anodes burn off due to the resulting oxygen and must be continuously renewed.

Alternatively, a plasma which is electrically conductive may be used as the anode. The conventional anode would thus be replaced by an energetic anode. The plasma may preferably be generated in an area above the trough by a suitable configuration and activation of the electrodes.

It is seen as a significant disadvantage of the cryolite-alumina method that it is very energy consuming because of the high binding energy of the aluminum. The formation and emission of fluorine, which sometimes occurs, is problematic for the environment.

In the method according to the present invention (ninth partial reaction), the bauxite and/or the aluminum oxide may be added to the method to achieve cooling of the process. The excess thermal energy in the system may be handled by the bauxite and/or the aluminum oxide. This is performed analogously to the method in which scrap iron is supplied to an iron melt in a blast furnace for cooling when the iron melt becomes too hot. For this purpose, for example, bauxite may be introduced into the reaction chamber in blocks which were previously crushed into the appropriate size using a shredder (stone grinder). Further bauxite and/or aluminum oxide may be "thrown in", if the desired temperature in the reaction chamber is exceeded, by a suitable control loop, which measures the temperature in the reaction chamber (e.g., using optical sensors).

Cryolite may be used as an aid if the method threatens to go out of control (see Wacker accident), in order to thus reduce the temperature in the system in the meaning of a novel cryolite-based emergency cooling. However, a noble gas emergency flooding system, which floods the reaction chamber with noble gas (preferably argon) in case of emergency (or before this occurs) is better suitable. This noble gas emergency flooding system may be used for each of the partial reactions. Further details on the chemical sequences and energy processes described may be inferred from the following pages.

Quartz sand may be reacted with liquid or also powdered aluminum exothermically to form silicon and aluminum oxide (as a byproduct) according to the Hollemann-Wiberg textbook (seventh partial reaction):

$$3\ SiO_2 + 4\ Al(l) \rightarrow 3\ Si + 2\ Al_2O_3\ \Delta H = -618.8\ kJ/Mol\ (exothermic)$$

Silicon combusts with nitrogen to form silicon nitride at 1350° C. The reaction is again exothermic (second partial reaction):

$$3\ Si + 2\ N_2\ (g)\ \xrightarrow{T = 1350°\ C.}\ Si_3N_4\quad \Delta H = -744\ kJ/Mol\ (exothermic)$$

Silicon then reacts slightly exothermically with carbon to form silicon carbide (tenth partial reaction):

$$Si + C \rightarrow SiC\ \Delta H = -65.3\ kJ/Mol\ (exothermic)$$

However, silicon carbide may be obtained endothermically directly from sand and carbon at approximately 2000° C. (eleventh partial reaction):

$$SiO_2 + 3\ C\ (g)\ \xrightarrow{T = 2000°\ C.}\ SiC + 2\ CO\quad \Delta H = +625,3\ kJ/Mol\ (endothermic)$$

This endothermic process for obtaining silicon proide may be powered, for example, by the heat (secondary energy) which arises upon the reaction of silicon dioxide with aluminum (seventh partial reaction) and/or nitrogen (second partial reaction). Silicon carbide may be obtained (tenth or eleventh partial reaction) in the same reaction chamber or in a downstream or neighboring reaction chamber.

In order to reclaim aluminum from the byproduct bauxite or aluminum oxide $Al_2O_3$ (twelfth partial reaction), liquid $Al_2O_3$ (melting point 2045° C.) is electrolyzed without adding cryolite to form aluminum and oxygen. The twelfth partial reaction is strongly endothermic and may be used for cooling the exothermic reactions (see, for example, ninth partial reaction). For this purpose, the corresponding reactions may be thermally coupled to one another. I.e., this endothermic process for reclaiming aluminum may also be powered using the heat which arises during the reaction of silicon dioxide with aluminum and/or nitrogen, for example. However, in addition to the heat, electrical current is also needed to "overcome" the high lattice energy of the $Al_2O_3$.

$$2\ Al_2O_3\ (l) \rightarrow 4\ Al(l) + 3O_2\ (g)\ \Delta H = +1676.8\ kJ/Mol\ (endothermic)$$

Production of the silanes:
Magnesium reacts with silicon to form magnesium silicide:

$$2\ Mg + Si \rightarrow Mg_2Si$$

Magnesium silicide reacts with hydrochloric acid to form monosilane $SiH_4$ and magnesium chloride:

$$Mg_2Si + 4\ HCl\ (g) \rightarrow SiH_4 + 2\ MgCl_2$$

This synthetic pathway also functions with aluminum. As a result, aluminum silicide $Al_4Si_3$ arises as an intermediate product. Higher silanes are possibly only accessible via polymerization of $SiCl_2$ with $SiCl_4$ and by subsequent reaction with $LiAlH_4$, as documented in the prior art.

However, according to the present invention the monosilanes are preferably produced according to the method referred to as the third partial reaction. The pathway via aluminum silicide or magnesium silicide is to be understood as an alternative. Further essential aspects of the present invention are described in the following.

In order to make the use of the primary energy providers more efficient, the primary energy provider, if it is not already mixed with the starting material(s) (sand, bauxite, slate, gneiss, mica, and/or granite), may be preheated separately. Thus, for example, crude oil may be brought to a boil before it is mixed with the starting material(s).

Instead of a primary energy provider, or in addition to the primary energy providers, the furnace may be provided with external or internal heating means, in order to be able to supply the heat required for starting the reactions (e.g., first partial reaction). Induction furnaces are especially suitable. However, it is also possible to couple the process according to the present invention (e.g., the first partial reaction) to a conventional power plant process, which operates using fossil fuels (e.g., hard coal). In this case, at least a part of the waste heat which arises in the conventional power plant process is used to heat the starting material(s).

In a further embodiment of the present invention, the reaction of the starting material(s) is initiated by bringing silicon (for example, in powdered form) into contact with nitrogen and/or aluminum (in powdered form or liquid). The silicon which is used here may initially have been obtained in a first partial reaction. At the end of the first partial reaction, a part of the resulting silicon may be stored in order to no longer have to start the cascade process according to the present invention later using a primary energy provider, which in turn generates $CO_2$.

In order not to have to release the $CO_2$, which arises upon combustion of the primary energy provider with the oxygen at the beginning of the process, into the environment, the flue gases which arise in this process may be brought back into the reaction chamber via a return line or a return duct. Introduction of the flue gas in such a way that the flue gas flows through or around the sand, bauxite, slate, gneiss, mica, or granite is especially suitable. The flue gas may first be sent into a cooling tower or a downstream decontamination system (such as a desulfurization system) or a filter when the primary energy provider containing hydrocarbon is "consumed" in the first partial reaction.

However, as indicated at the beginning, water glass may also be used. Water glass is a water-soluble alkali silicate. These are glass-like, i.e., amorphous, noncrystalline compounds which typically have the following composition: $M_2O.SiO_2$ with n=1 through 4. Until now, sodium and potassium silicates have frequently been used industrially. According to the present invention, sodium silicate, potassium silicate, but also aluminum silicates or mixtures of two or more of these silicates may also be used.

Because aluminum has similar chemical behavior to silicon, a combination of the processes in which silicon compounds and aluminum compounds are used is especially advantageous. For example, the use of aluminum silicates which comprise $SiO_2$ and $Al_2O_3$ is especially preferable.

Providing the corresponding silicates and/or producing the water glass is referred to as the thirteenth partial reaction.

The silicates or the water glass may be used per se as a starting material for the method according to the present invention, or they may be mixed with sand, or the other starting materials, for example (fourteenth partial reaction), to obtain a starting material (referred to as starting material I) better suitable for the second partial reaction, for example Silicate or water glass may also be used to produce a mixture with one or more of the primary energy providers (e.g., mineral oils) (fifteenth partial reaction) and used to provide the hydrocarbon component necessary for starting the process according to the present invention and to provide reactants which encourage or accelerate the reaction (referred to as starting material II).

As described at the beginning, the fossil fuels which are combusted in power plants are loaded with sulfur residues. According to European Patent Application 06 126 325.7 (which corresponds to U.S. patent application Ser. No. 11/776,505), $H_2O_2$ may now be provided as an energy carrier in a power plant process based on fossil fuels.

Since pure (=water-free) $H_2O_2$ is unstable and may explode spontaneously, when it comes into contact with metals, for example, it is circulated according to the present invention in at most seventy-percent solution in water (in aqueous solution). This limiting value of 70% is referred to here as the critical concentration limit.

The solution is selected according to the present invention so that the concentration of $H_2O_2$ lies below the critical concentration limit. The solution is then transported to a consumer (filling station, final consumer). By cleaving off hydrogen and/or oxygen from the solution, energy may be generated at the consumer by using the hydrogen and/or oxygen as an energy supplier and/or fuel.

Oxygen is preferably used in the reaction to peroxosulfuric acid, which is taken either from the (ambient) air, from $CO_2$ exhaust gas of the power plant process, or from a silicon dioxide reduction process (first partial reaction), as described above.

The $H_2O_2$ is especially well suitable as an energy provider or fuel. The transport of the reversibly usable hydrogen carrier, which was produced according to the present invention, to a consumer may be performed in various ways (e.g., by a transport vehicle), this transport being absolutely without problems, because the hydrogen carriers are relatively noncritical to handle.

At the location of use, hydrogen and/or oxygen may be cleaved off of the reversibly usable hydrogen carriers. The hydrogen may then be used in a fuel cell, for example.

In the following, various preferred approaches for the technical implementation of the present invention are explained with reference to schematic figures. It is to be noted that the illustrations of the reaction areas in the form of combustion chambers or furnaces are solely to be understood as examples. It is obvious that the method according to the present invention may also be used in combustion chambers or furnaces which are designed differently.

Figure 16:
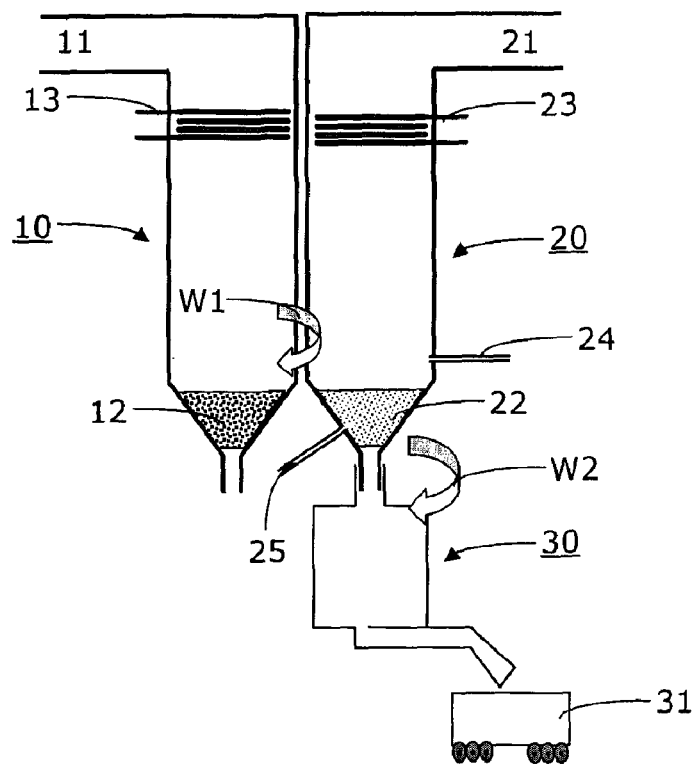
FIG. 16: shows a diagram of a first exemplary embodiment according to the present invention.

A first embodiment is shown in FIG. 16. As may be seen in FIG. 16, two vertically operating combustion furnaces 10 and 20 (e.g., blast furnaces) are situated neighboring one another. The first combustion furnace 10 has an outlet area 11 and the second combustion furnace 20 has an outlet area 21 for the exhaust gases (flue gas) arising in each case. The first combustion furnace is charged with a fossil fuel 12 (e.g., hard coal) and the fossil fuel is combusted using oxygen (e.g., air oxygen). A large quantity of heat is released during this method, which is known per se, which is partially transferred via a heat exchanger 13 to a medium (e.g., water), to drive turbines and thus obtain current using the resulting water steam.

According to the present invention, the various reactions run in a cascade. In the exemplary embodiment shown, there is a heat coupling to the second combustion furnace 20, i.e., the two furnaces 10 and 20 are directly or indirectly thermally coupled to one another, which is indicated in FIG. 16 by the arrow W1.

The thermal coupling may be implemented in this and the other embodiments in that the two furnaces stand wall-to-wall. The coupling may also be performed via a suitable passive (e.g., using thermal conductors) or active thermal bridge (e.g., using a heat exchanger and a corresponding transport medium).

In the second combustion furnace 20, one of the starting materials 22 containing the silicon oxide is heated by the quantity of heat W1 provided by the first furnace 10. I.e., the reaction running in the first furnace 10 is more or less used as the primary energy provider for a first partial reaction of the present invention. In this first partial reaction, the silicon dioxide is converted into silicon. For example, air having the typical nitrogen component (or pure nitrogen) may be introduced into the furnace 20 by a lance 24 or similar means. It is obvious that the location of the introduction may also be selected differently. The silicon reacts with the nitrogen to form silicon nitride (see second partial reaction). This reaction is strongly exothermic and the quantity of heat arising may be transferred partially or entirely via a heat exchanger 23 to a medium (e.g., water) to drive turbines and thus obtain current using the resulting water steam.

A variation of the first embodiment in which this secondary heat is in turn used to support or allow a further partial reaction is especially preferable. Thus, for example, as indicated in FIG. 16, a reaction area 30 may be provided, which absorbs the silicon nitride resulting from the second partial reaction and converts it into porous silicon nitride, silicon flakes, or silicon powder, which has a significantly greater volume and a significantly greater surface area, while supplying heat and/or for the reactants and/or pressure. This sixth partial reaction may be supported or made possible, through suitable thermal coupling, by the secondary heat of the second partial reaction, which is indicated in FIG. 16 by the arrow W2.

The silicon nitride may be removed, as indicated in FIG. 16 by a freight car 31. $CO_2$ may be introduced into the furnace 20 (this step is optional). The $CO_2$ may either be guided from the exhaust gas area 11 of the first furnace 10 into the second furnace 20, or $CO_2$ from the ambient air may be introduced and reduced, i.e., made "harmless".

Figure 17:
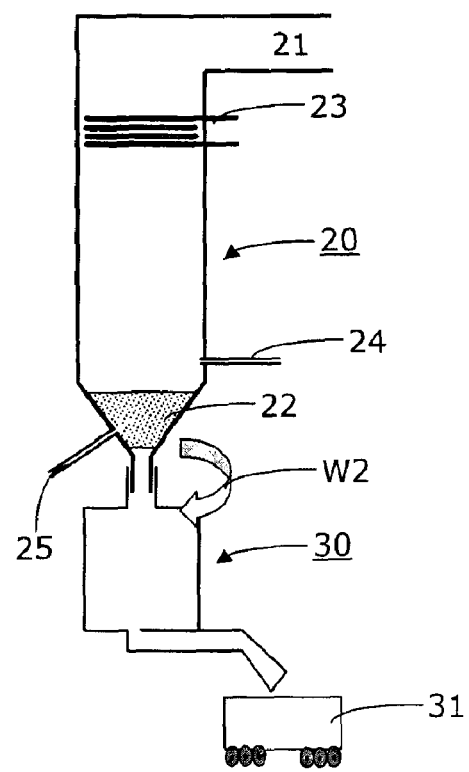
FIG. 17: shows a diagram of a second exemplary embodiment according to the present invention.

A second embodiment is shown in FIG. 17. As shown in FIG. 17, a vertically operating combustion furnace 20 is provided. One of the starting materials 22 containing the silicon dioxide is heated in the combustion furnace 20 by the combustion of a primary energy provider (e.g., fossil fuels such as oil and/or tar). Inter alia, silicon arises in this first partial reaction of the present invention. Analogously to the first exemplary embodiment, silicon nitride and heat arise due to the introduction of nitrogen. However, in an alteration of this process, the silicon may also react with carbon to form SiC (see tenth partial reaction). The carbon may originate from the fossil fuels or from $CO_2$, which may be optionally introduced into the furnace 20 (e.g., by a supply 25). This partial reaction also runs exothermically, but delivers significantly less heat than the second partial reaction.

$CO_2$ may also be introduced into the furnace 20 in the second embodiment, as noted.

A variation of the second embodiment in which this secondary heat W2 is in turn used to support or allow a further partial reaction is especially preferable. Thus, for example, as indicated in FIG. 17, a reaction area 30 may be provided, which absorbs the resulting silicon carbide from the tenth partial reaction and dries, sinters, or otherwise refines it while supplying heat and/or further reactants and/or pressure. This further reaction may be supported or made possible by the secondary heat of the tenth partial reaction by a suitable thermal coupling, as indicated in FIG. 17 by the arrow W2.

The silicon carbide or the refined silicon carbide may be removed, as indicated in FIG. 17 by a freight car 31.

Figure 18:
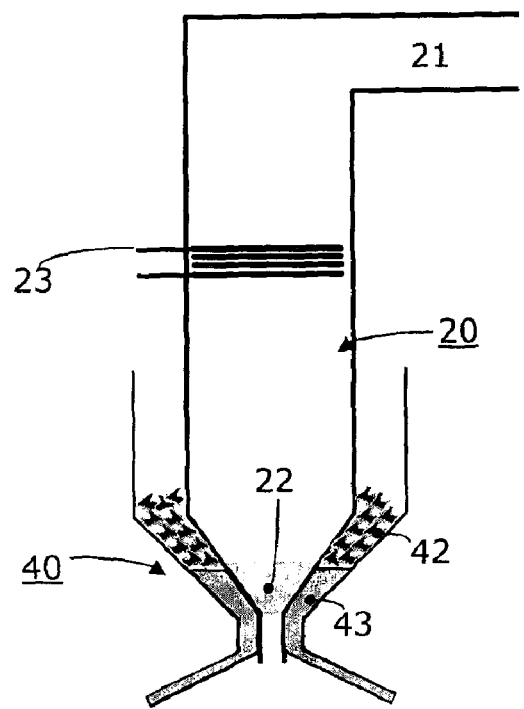
FIG. 18: shows a diagram of a third exemplary embodiment according to the present invention.

A third embodiment is shown in FIG. 18. As may be seen in FIG. 18, a vertically operating combustion furnace 20 is provided. One of the starting materials 22 containing the silicon dioxide is heated in the combustion furnace 20 by the combustion of a primary energy provider (e.g., fossil fuels such as oil and/or tar). Inter alia, silicon results in this first partial reaction of the present invention. Analogously to the first exemplary embodiment, silicon nitride and heat result due to the introduction of nitrogen. This partial reaction runs strongly exothermically. In order to cool the furnace 20 and thus be able to control the second partial reaction, aluminum oxide 42 (with or without cryolite) is used as a coolant in a separate reaction area 40, which at least partially encloses the furnace 20. The aluminum oxide 42 may be poured in from above and, because of the great heat which the furnace 20 releases, is converted into liquid aluminum 43, which may drain off downward, for example. This conversion (reduction process) runs if electrodes for the (fused-salt) electrolysis are provided in the reaction area 40.

The reaction area 40 comprises a steel trough, for example, which is lined with carbon material for the (fused-salt) electrolysis. These details are not shown in FIG. 18. Liquid electrolyte (aluminum oxide with or without cryolite) is located in this trough. Anodes (e.g., carbon blocks), which are connected to a positive pole of a voltage source, are immersed in the electrolytes. The trough is used as a cathode and is connected to the negative pole. The aluminum reduced in this twelfth partial reaction (see equation below) is heavier than the electrolyte and therefore collects on the bottom of the trough. From there, it is drawn off using a suction pipe, for example.

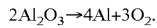
$2Al_2O_3 \rightarrow 4Al + 3O_2$.

The starting material for this electrolysis (which is also known as fused-salt electrolysis) is bauxite, a blend of clay minerals such as aluminum oxide and aluminum hydroxide $(Al(OH)_3)$. Silicon dioxide is also often present in the bauxite. Until now, the bauxite has typically first been separated from the included iron oxides (e.g., using the Bayer method). Moreover, the silicon oxide, which "contaminates" the bauxite, is then typically separated off. According to the present invention, it is not absolutely necessary to perform this complex separation of the components of the blend, because there is sufficient energy in the process and the preparation of pure aluminum is not the primary concern.

As also in the aluminum production used industrially until now, the bauxite (with or without the above-mentioned components of the blend) may be diluted with water to produce aluminum hydroxide. The bauxite may also be mixed with water steam or hypercritical water (at over 407° C. and high pressure) in order to produce aluminum hydroxide.

Aluminum oxide is produced by heating the aluminum hydroxide to approximately 1200° C. to 1300° C. (e.g., using secondary energy):

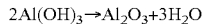
$2Al(OH)_3 \rightarrow Al_2O_3 + 3H_2O$

This aluminum hydroxide is then subjected to (fused-salt) electrolysis with or without cryolite, as described.

The cooling effect may be reinforced or reduced by the controlled addition of bauxite and/or aluminum oxide. In this embodiment, high-grade aluminum arises in addition to the product of the second partial reaction.

Figure 19:
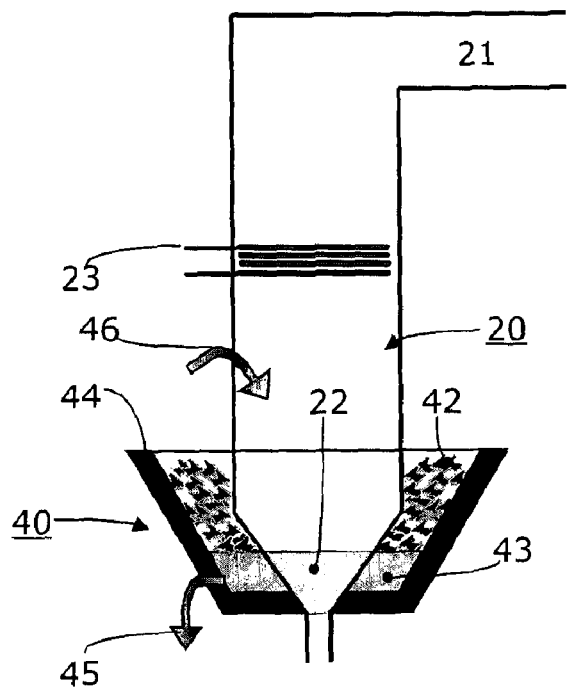
FIG. 19: shows a diagram of a fourth exemplary embodiment according to the present invention.

In a further preferred embodiment, which is schematically illustrated in FIG. 19, aluminum 43 is added in liquid or powdered form to the silicon dioxide 22 in a reaction area (e.g., the reaction area of the furnace 20). This addition of aluminum is indicated in FIG. 19 by the arrow 46. The aluminum is also obtained in this embodiment in a twelfth partial reaction using (fused-salt) electrolysis, which is executed in a reaction area 40 in the form of a trough, which is lined with carbon material 44. Aluminum 43 is formed from the aluminum oxide 42 (with or without cryolite) in this trough when a high current is applied to the anode(s) and the carbon material 44 used as a cathode. The aluminum 43 settles and may be drawn off at the bottom by a suction pipe, or may be removed downward through a fall pipe 45. The liquid aluminum may also be brought into the reaction area of the furnace 20 from this removal point, in order to withdraw the oxygen from the silicon dioxide. A nitrogen atmosphere preferably exists in the furnace 20 in this phase of the process.

Analogously to the known thermite reaction (a redox reaction, in which aluminum is used as a reducing agent to reduce iron oxide to iron, for example) the aluminum is used here as a reducing agent to tear the oxygen from the silicon dioxide. This reaction (seventh partial reaction) runs strongly exothermically and provides an enormous quantity of heat. This quantity of heat may in turn be coupled into the process for producing the aluminum (twelfth partial reaction) running in parallel and/or the quantity of heat may be used to generate current (using heat exchanger 23).

Figure 20:
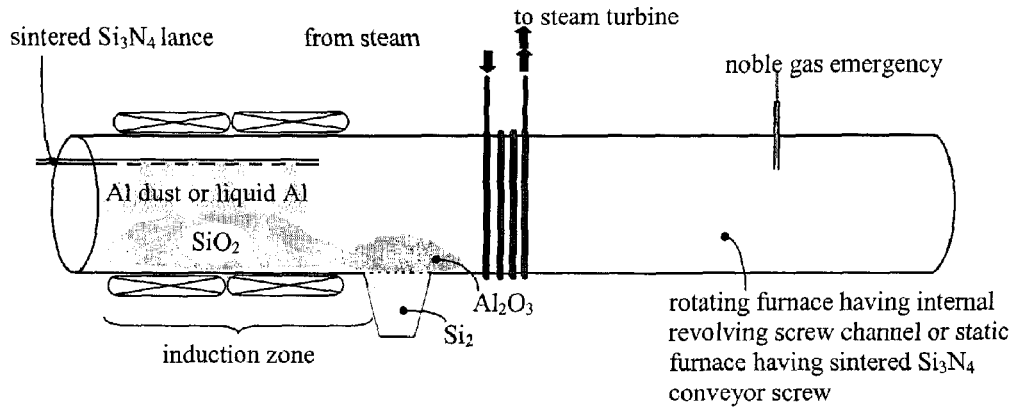
FIG. 20: shows a diagram of a fifth exemplary embodiment according to the present invention.
Figure 21:
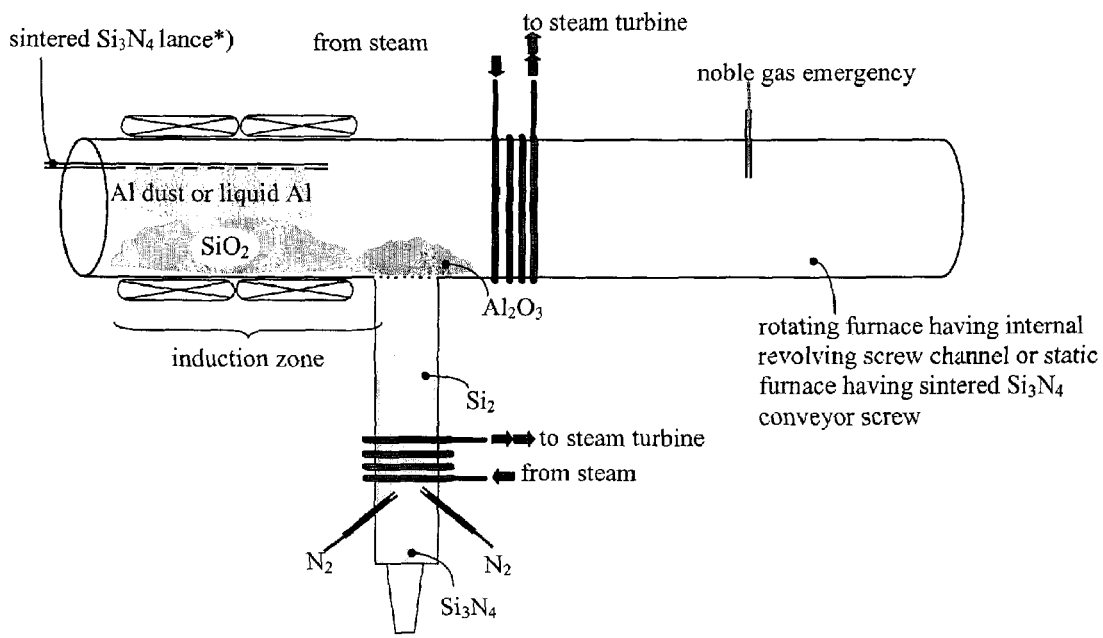
FIG. 21: shows a diagram of a sixth exemplary embodiment according to the present invention.

Two further possible embodiments are schematically illustrated in FIGS. 20 and 21. Furnaces which are mounted horizontally or slightly diagonally are used in both cases.

The energy-material cascade coupling ($EMC^2$) according to the present invention is distinguished in that processes run as in dissipative structures beyond thermal equilibrium, as in living structures of cells and organisms.

According to the present invention, there is a changeover to nitrogen-combusting processes, instead of operating combustion processes using oxygen as up to this point.

What is claimed is:

1. A method for providing energy in a power plant process, having the following steps:
    introducing a starting material into a reaction area, the starting material comprising one or more of the following components: silicon dioxide contained in sand, bauxite, quartz, gneiss, mica, granite, slate, or construction rubble;
    providing a primary energy provider containing hydrocarbon to start a first reaction, in which the starting material is heated from said primary energy provider and crystalline silicon is produced from the starting material;
    using the crystalline silicon and a carbon dioxide in a second reaction which runs exothermically;
    using heat produced from said second reaction to supplement the heat generated by the primary energy provider when heating the starting material and/or to supply heat to at least one further reaction or series of reactions, at the end of which a silicon compound is produced.

2. The method according to claim 1, wherein the primary energy provider containing hydrocarbon is added to the starting material, or the starting material already comprises the primary energy provider containing hydrocarbon.

3. The method according to claim 1, wherein the primary energy provider containing hydrocarbon contains one more of the following substances: oil, tar, or asphalt.

4. The method according to claim 1, wherein in the second reaction, said crystalline silicon is reacted with nitrogen to form silicon nitride.

5. The method according to claim 1, wherein in the second reaction, silicon is reacted with carbon to form silicon carbide.

6. The method according to claim 1, wherein liquid or powdered aluminum is supplied to the starting material, in order to remove oxygen from the silicon dioxide of the starting material.

7. The method according to claim 1, wherein $CO_2$ and liquid or powdered aluminum are supplied to the first reaction, the aluminum reducing to aluminum oxide and removing the oxygen from the $CO_2$.

8. The method according to claim 1, wherein the reactions run sequentially or simultaneously.

* * * * *